United States Patent Office 3,624,948
Patented Dec. 7, 1971

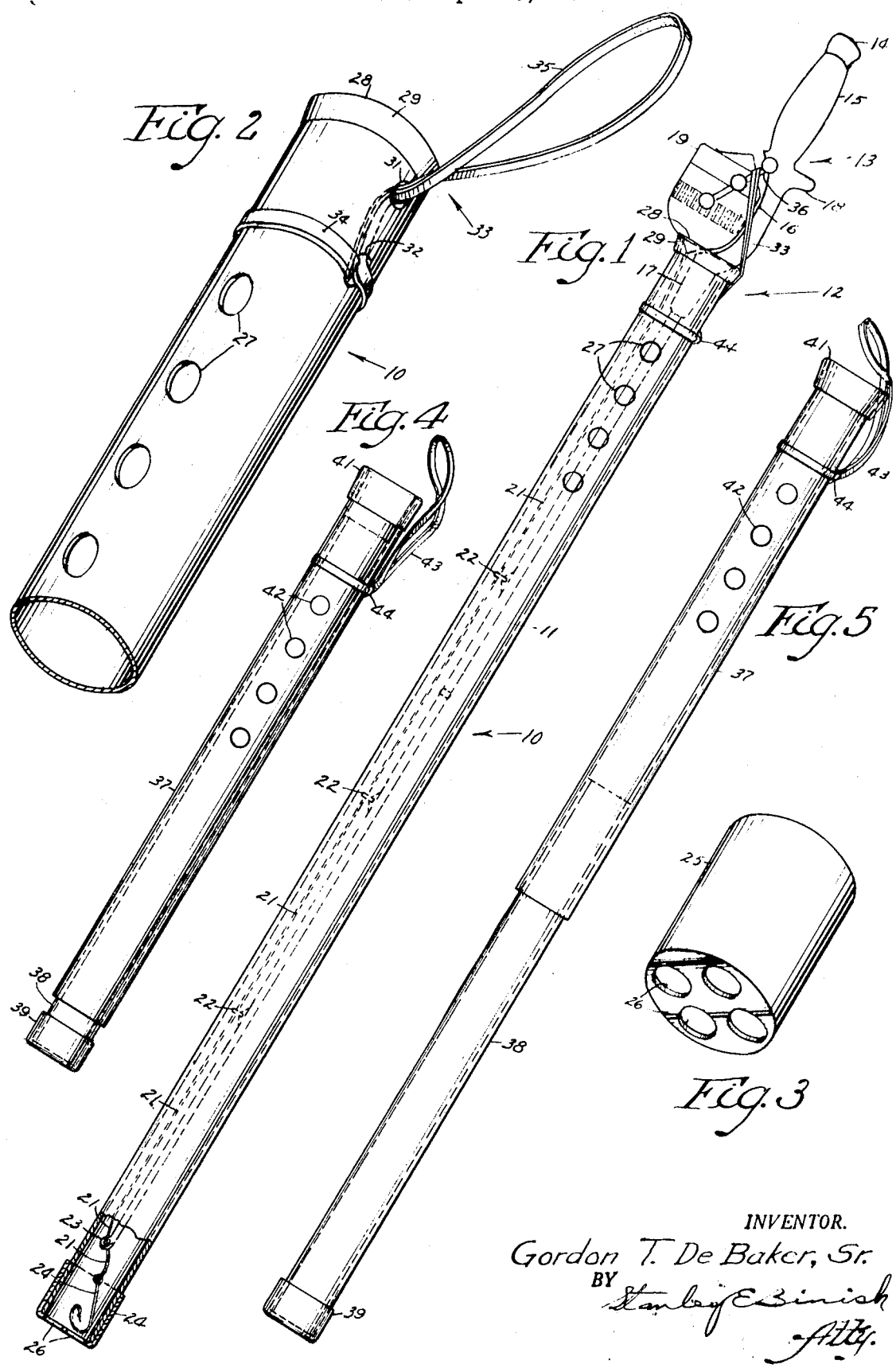

3,624,948
FISHING ROD AND REEL CASE
Gordon T. De Baker, Sr., 1647 Forest Glen,
Green Bay, Wis. 54304
Continuation-in-part of application Ser. No. 848,542,
Aug. 8, 1969. This application Apr. 6, 1970, Ser.
No. 25,955
Int. Cl. A01k 97/08
U.S. Cl. 43—26                                    11 Claims

ABSTRACT OF THE DISCLOSURE

A tubular case for a combined fishing rod and reel, wherein only the rod shaft, line and hooks are received within the tubular case, and the attached reel and handle means are disposed externally thereof, and wherein the rim of the case is held urged against the handle means by means of a tensioned elastic band, thereby securing the tubular case in a position covering the rod shaft, line, and hooks, only, and excluding the rod handle and reel, therefrom.

---

This is a continuation-in-part of co-pending application Ser. No. 848,542 filed Aug. 8, 1969 and now abandoned.

The fisherman faces no greater problem than that of housing and storing his rod and reel, particularly his combined rod and reel, in an economical, simplified and "grab-it-and-go" form when moving about and transporting it from place to place.

In moving from place to place a fisherman often desires to transport his rod, reel, line, hook and bait thereon as an assembled unit in readiness for immediate use when he arrives at the new destination.

During such conveyance the rod and reel assemblage is usually placed on the bottom of a cluttered boat or in a disordered automobile interior, and is sometimes eagerly carried over long distances through the woods and brush. Obviously under such circumstances the opportunities for line tangling and hook catching and personal exasperation, are numerous and manifold.

The purpose of this invention is to avoid and eliminate the need for disassembling a rod, reel, line and hook in preparation for transporting such assemblage from place to place.

An object of this invention is the provision of economical, simple, and lightweight tube means for receiving the combination slender rod shaft, line, hooks and bait, but excluding the handle end and reel of a combined rod and reel assemblage.

Another object is to provide a tubular case for receiving only the rod shaft end of a fish rod and securing the externally disposed handle portion and reel yieldably against the adjacent rim of the tubular case by means of a tensioned resilient means.

Other specific features and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a side elevation view of the invention showing a rod and reel assemblage the slender rod shaft thereof being received and enclosed in a tubular case and the exposed handle and reel being drawn into engagement with the rim edge portion of the tubular case by rubber or elastic band means;

FIG. 2 is a fractional enlarged isometric view of the upper portion of the tubular case, showing one end portion of the elastic band secured to the tubular case and presenting the other end as a freely extending loop;

FIG. 3 is an enlarged isometric view of the cap for the lower end of the case, showing the apertures or vents in the end wall of said cap;

FIG. 4 is a modification showing a side elevation of a telescopic case, the case being shown in retracted condition; and FIG. 5 is a side elevation view of the telescopic case of FIG. 4, showing the case in extended condition.

Referring now to the drawings, wherein like reference numerals designate like or corresponding parts throughout the several views thereof, there is shown in FIG. 1 a tubular case or tube generally indicated at 10 in which is received only the shaft portion 11 of a rod and reel assemblage generally indicated at 12.

The rod handle means, generally indicated at 13 comprises a butt cap 14, a cork hand grip 15, an offset reel seat 16, a rod chuck 17 to receive the butt end of shaft 11, and a finger piece or trigger 18.

Obviously, a straight type handle and a multiple-piece or telescopic shaft can be used in lieu of the offset type handle and one-piece shaft shown.

Reel means 19, for winding up line 21, is secured on the offset reel seat 16 by any means such as by conventional clamp and screw means, or hood and nut means, or the like not shown. The reel means provides a projection on the rod handle over which a rubber band may be conveniently looped, connected or fastened as hereinafter disclosed.

Fishline 21 is threaded through eye guides such as at 22, and tip-top guide 23, and is provided with a fish hook, bait, or lure 34, or the like, at the end thereof.

The tubular case 10 comprises a tube of polyethylene plastic, translucent or transparent, of a diameter to somewhat loosely and suitably receive the rod shaft 11 and the projecting guides thereon; and of a length to extend substantially from the drawn-up fish hooks, bait, or lure 24, to the reel means, that is, of a length slightly greater than the distance from the tip-top end to the reel on said handle means, as hereinafter more purposely described.

The bottom end of the tube 10 is provided with a removable cap 25 press-fit on the end thereof. The end wall of the cap is provided with apertures or vents such as shown at 26 to provide air ventilation axially through the tube in conjunction with companion apertures or vents 27 in the wall of the upper portion of the tube 10.

The upper end of the tubular case or tube 10 terminates in a circular edge or rim 28 defining an axial opening into the tubular case 10. Said rim portion is flanged or enlarged as at 29 to reinforce said rim.

A pair of longitudinally spaced securement apertures, such as indicated at 31 and 32, are provided to receive an endless resilient loop or band, such as a rubber or elastic band, or the like, generally indicated at 33, interlaced through said apertures and around said tube to fasten said rubber band to said tube 10.

The interlacing of said elastic band is accomplished by first disposing said elastic band around the tube such as at 34, and then threading the free end thereof inwardly through aperture 32 and then outwardly through aperture 31, and finally drawing the band taut. The band is thus secured to the tube, and further results in a free loop end portion 35 for purposes hereinafter described.

Operation

When a fisherman decides to move to another or better fishing location, he merely reels in the line until the hook, bait or lure 24 engages the tip-top guide 23. Then, without disassembling his fishing tackle, he thrusts the shaft end 11 of the rod into the tubular case 10, through the rim 28 opening, until the reel means 19 and/or the handle means 13 seats, abuts on, or otherwise engages the rim edge 28. Obviously, any element projecting from the handle means may serve as such rim abutment, inclusive of the reel.

The free loop end 35 of the elastic band 33 is then looped over projecting anchor means on the handle means 13, such as over the reel handle 36, over the body of the reel means, or trigger 18, or the like, in initial elastic tension, to urge and bias said reel means and/or the handle means securely against said rim 28. Obviously, the rubber band can be looped over any such suitable anchor element extending or projecting from the handle means inclusive of the reel.

With the line and hook thus safely stored and protected, the fisherman can place such assemblage in his automobile, or on the bottom of his boat, without fear that the line will become entangled or the hooks become snagged with the abundance of other equipment thereabout, or entangled with the brushy shoreland environment in the event he chooses to walk to such other place.

When the fisherman reaches his other desired location, he merely unloops or otherwise disengages the free elastice loop 35 from anchor element on the handle means, graps cork hand grip, and freely withdraws the rod shaft from the tubular case, and thus has at his immediate and prompt disposal a fully assembled rod, reel, line and hook arrangement, without wasting time re-assembling, untangling or unsnagging same.

The elastic band connection provides quick-connect and quick-disconnect means; and further allows a fisherman to withdraw the reel and handle means away from its rim seat, against the tension of the still engaged elastic band, stretching said elastic band, to make a cursory inspection of the reel means should that be desired, without actually disengaging the elastic band from the reel means.

The tube is preferred to have a stock length of about six feet. This length allows a fisherman to tailor the tube to the length of his particular rod as by cutting off an end portion of the tube and replacing cap 25 thereon. The tube should be of a length that when the reel means and/or the handle means is seated or abuts on the rim edge, the tip-top guide and hook clears the end wall of the cap 25. This length eliminates the possibility of the tip-top guide or the hook bottoming on the end wall of said cap 25 and bowing the rod shaft.

A tube diameter of one and one-fourth inches has been found suitable, however, other diameters may be feasible, but the invention is not limited to any particular tube diameter dimension.

A tube diameter that loosely and suitably receives the rod shaft will of necessity be too small to receive the much greater bulbous structure of the reel means on the rod handle. As a result the reel means acts as stop means against which the tube rim 28 abuts and engages, thereby disposing the reel and handle means desirably externally of the tube and thus affording case coverage of the troublesome line and hook only.

A polyethylene tube wall thickness of about .050 inch provides a suitable rigidity to the tube, but the invention is not limited to such thickness.

The telescopic modification of FIGS. 4 and 5 comprises a case having an upper tubular portion 37 and a lower tubular portion 38 telescopically related, that is, the lower portion sliding within the upper portion with the outer periphery of the lower tube 38 being slidably engaged with the inner periphery of the upper tube 37. The peripheries are engaged with sufficient frictional resistance to allow for a manual telescoping of said tubular portions and a holding or maintaining of such telescoped state or condition, suitable for the intended purpose. The telescopic tubes 37 and 38 are relatively movable axially and rotatably.

This telscopic case modification allows one to adjust the length of the case to correspond to the length of the received rod by merely telescoping the tubular portions 37 and 38 relative to each other, in lieu of cutting a stock length tube to the desired length or hereinbefore described.

Furthermore, for convenience is in mailing and merchantising the telescopic type case, the case portions can be retracted or shortened to a length of about one-half the length of the unitary stock type of FIG. 1.

An end cap 39, a rim 41, and apertures 42 are provided for the modification corresponding to the similar elements of the unitary case shown in FIGS. 1 and 2. However, the fixation of the rubber band 43 to the modification differs from the band fixation to unitary case of FIGS. 1 and 2 in that one end of the band 43 is stretched around the periphery of the tube 37 and secured to the case in such stretched condition by any means as by cement or by a knot 44, in lieu of interlacing through apertures as hereinbefore described. The free end portion of the band is looped and anchored over the rod handle or reel as hereinbefore described for the unitary type case of FIGS. 1 and 2. However, this telescopic modification may be provided with the interlaced rubber band fastening means as shown in FIG. 2.

Some characteristic features of this invention are the provision of a unitary tubular case or a two part telescopic case for receiving only the rod shaft, line, and hooks of a rod and reel assemblage; and the provision of resilient means on such tubular case for yieldably connecting and holding the rim edge of said tubular case against projecting abutment means on the externally disposed handle means of such assemblage, said resilient means being secured to anchor means projecting from said handle means.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. In a rod and reel assemblage including a shaft having line guides thereon, handle means for said shaft including reel means, the improvement comprising:
   (1) a tubular case loosely receiving
      said shaft and line guides,
         (a) said tubular case extending substantially from the tip of said shaft and terminating in abutment with said handle means, and
   (2) connecting means for securing said tubular case to said handle means
      (a) said connecting means including resilient means adapted to urge said handle means in abutment against the adjacent rim of said tubular case.

2. The apparatus of claim 1 and aperture means at the upper end of said tubular case, and wherein the resilient means is an endless rubber band one end portion being disposed around said tubular case at said aperture means and the other end being interlaced through said aperture means and terminating in a free end loop looped over said handle means.

3. The apparatus of claim 2 wherein the tubular case comprises telescopically related portions.

4. In a rod and reel assemblage including a shaft having line guides thereon, handle means for said shaft including reel means mounted on said handle means, a fish line extending from said reel means and terminating substantially at the tip of said shaft, and fish hook means connected to the end of said fish line, the improvement comprising:
   (1) a tubular case loosely receiving said shaft and line guides,
      (a) said tubular case extending substantially from said fish hook and terminating in abutment against said handle means,
   (2) aperture means at the upper end of said tubular case, and (3) an endless rubber band,
  (a) one end portion thereof being disposed around said tubular case at said aperture means, and
  (b) the other end being interlaced through said aperture means and terminating in a free end loop looped over said handle means for anchorage therewith.

5. The apparatus of claim 4 and a cap for the lower end portion of said tubular case.

6. The apparatus of claim 4 wherein the tubular case is made of plastic.

7. The apparatus of claim 4 wherein the tubular case is transparent.

8. The apparatus of claim 4 wherein the tubular case comprises telescopically related portions.

9. A rod and reel case, comprising:
  (1) a plastic tube adapted to loosely receive the shaft and line guides of a fish rod,
    (a) said tube being of a length substantially as long as the shaft of such rod,
  (2) aperture means at one end of said tube, and
  (3) an endless rubber band,
    (a) one end portion thereof being disposed around said tube at said aperture means, and
    (b) the other end being interlaced through said aperture means and terminating in a free end loop.

10. The case of claim 9 wherein the aperture means comprises at least two apertures.

11. The case of claim 9 wherein the tube comprises telescopically related portions.

References Cited
UNITED STATES PATENTS

| | | | |
|---|---|---|---|
| 3,131,503 | 5/1964 | Gottula | 43—26 |
| 2,143,720 | 1/1939 | Smith | 43—26 X |

WARNER H. CAMP, Primary Examiner